United States Patent [19]

Blood et al.

[11] Patent Number: 5,140,461

[45] Date of Patent: Aug. 18, 1992

[54] ADJUSTABLE VIEWING SCREEN HOUSING AND DISPLAY DEVICE

[75] Inventors: Robert J. Blood, Holcomb; Wallace A. Krapf, Macedon, both of N.Y.

[73] Assignee: Krapf Business Systems, Inc., Macedon, N.Y.

[21] Appl. No.: 685,140

[22] Filed: Apr. 15, 1991

[51] Int. Cl.⁵ .......................................... G03B 21/56
[52] U.S. Cl. .................................................. 359/461
[58] Field of Search ............................... 359/443, 461

[56] References Cited

U.S. PATENT DOCUMENTS 4,556,283 12/1985 Numata et al. ...................... 359/443

Primary Examiner—Richard A. Wintercorn
Attorney, Agent, or Firm—Shlesinger, Fitzsimmons & Shlesinger

[57] ABSTRACT

Viewing screen and display apparatus including a housing for concealing the viewing screen when not in use, and a lifting assembly having a pair of lifting arms mounted slidably on a pair of tracks inside the housing and being tiltable outwardly. When raising of the viewing screen is desired, the viewing screen casing is tilted outwardly and a cable is pulled to lift the viewing screen casing to a desired height. The cable may be locked in any suitable position to keep the screen casing in a suitable elevation. The viewing screen, which normally is rolled up within the casing, includes a magnetic strip which can be used to retain the viewing screen in a proper extended position for use.

8 Claims, 4 Drawing Sheets

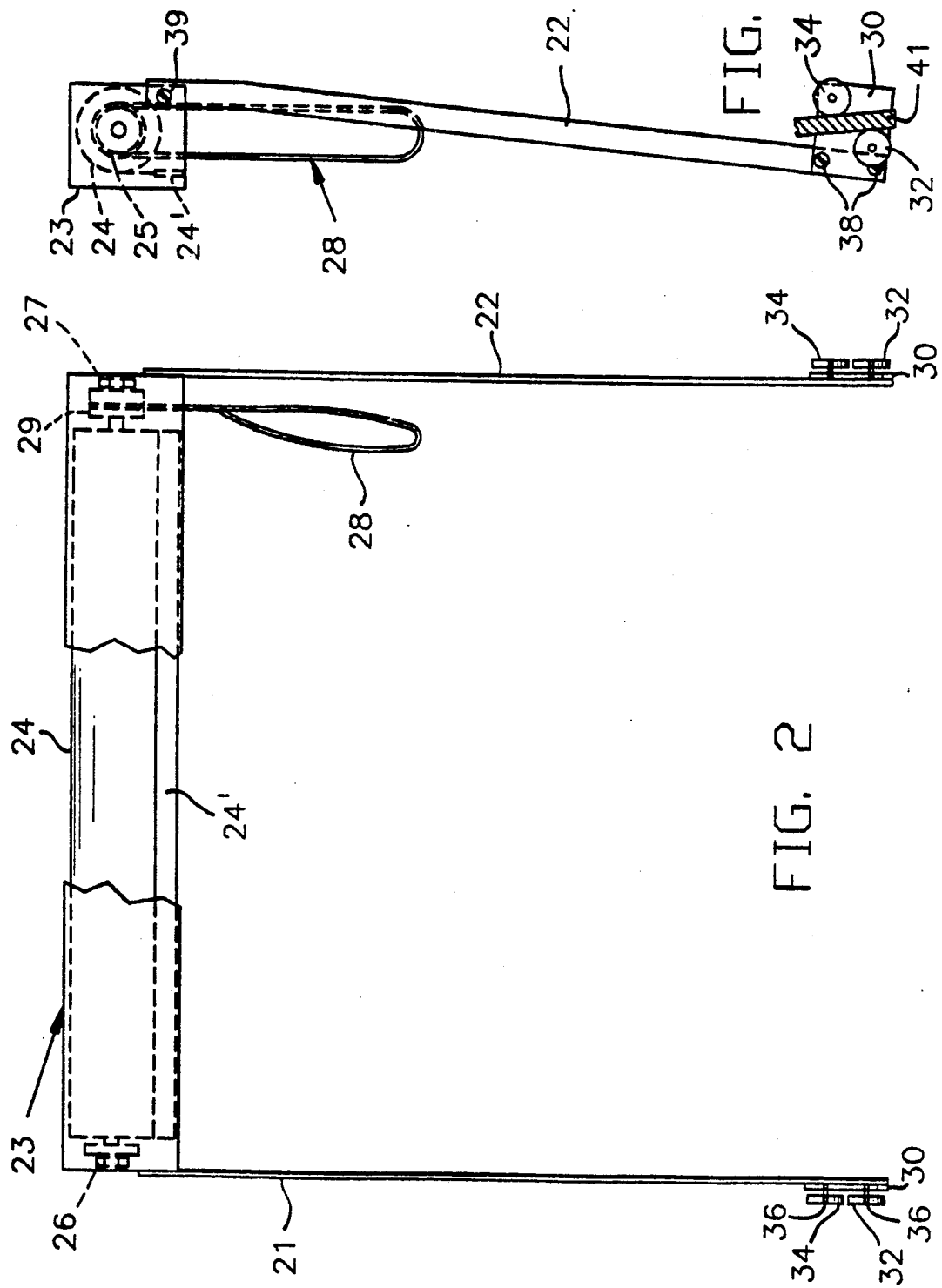

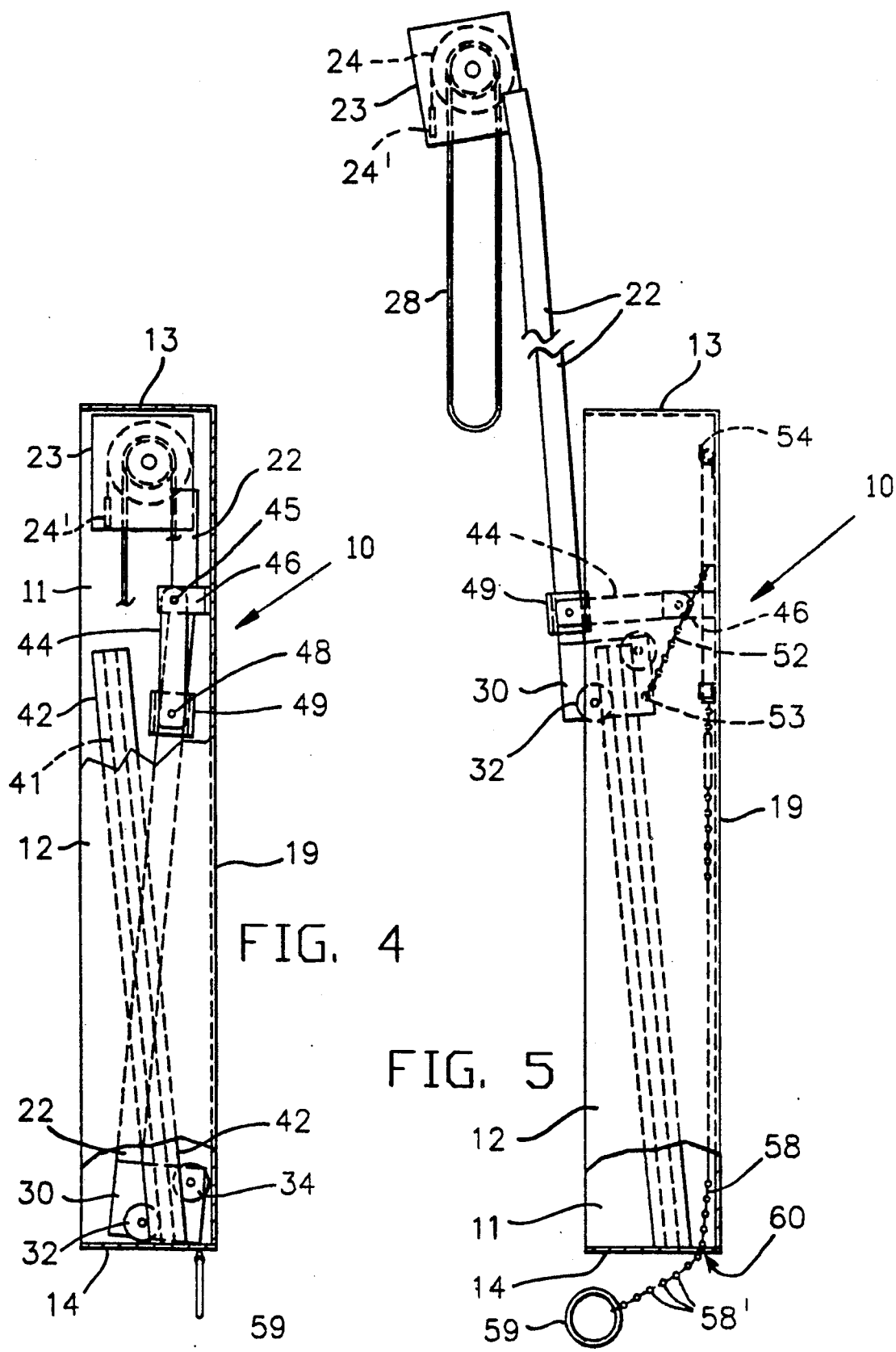

ADJUSTABLE VIEWING SCREEN HOUSING AND DISPLAY DEVICE

FIELD OF THE INVENTION

This invention relates to a housing for display apparatus, and more particularly a housing containing an adjustable viewing screen and display boards having writing surfaces thereon.

BACKGROUND OF THE INVENTION

Projection screens are commonly used in conferences for their attention-getting effect so that information can be communicated more effectively. Visual communication aids assist the speaker or instructor graphically to animate and hold the viewer's attention. Normally viewing screens are supported on stands, or are mounted on or against a wall. In these locations the screen, or at least its casing, is constantly in view and detracts from the appearance of the conference room or office. Therefore, it is desirable to house the viewing screen within a stylish cabinet which can compliment or match room decor. It is also useful that the doors of the cabinet have writing surfaces on their inside and/or outside surfaces.

When the doors of the cabinet are opened, access to the viewing screen is obtained. While the writing surfaces of the doors need to be at a reachable level, the elevation of the viewing screen is usually desirably higher, so that the persons positioned near the rear of the conference room may still view the information being displayed on the screen. In order to elevate the viewing screen, means must be provided to lift above the top of the cabinet the roll or spool upon which the viewing screen is mounted.

OBJECTS AND SUMMARY OF THE INVENTION

One of the important objects of this invention is to provide a combination cabinet and viewing screen housing which includes extensible viewing screen supports for selectively maintaining the viewing screen in an elevated position.

Another object of this invention is to provide a draw chain which is operable at a reachable height to raise the viewing screen into the elevated position.

Yet another object of the invention is to provide locks for holding the elevated screen at various heights.

Still another object of the invention is to provide a stable track system for raising and lowering the viewing screen.

Still another object of the invention is to provide a housing formed of a cabinet construction for concealing the viewing screen during periods of non-use.

Yet another object of the invention is to provide writing surfaces inside the cabinet housing and on the doors thereof.

In summary, this invention is directed to a viewing screen system which includes a housing for concealing the viewing screen from view during periods of non-use, and a lifting mechanism for elevating the viewing screen to an operable position for viewing.

The lifting mechanism includes a pair of tracks located adjacent the sides of the housing, and a pair of substantially vertically extending lifting arms which are slidably connected to the tracks for raising the viewing screen roller housing above its stored location. The lifting arms are connected to a chain which acts as a lifting cable to operate the lifting arms when tension is applied to the chain. The chain also includes a plurality of stops which are engagable in a slot on the housing for variably locking the lifting arms in desired degrees of extension.

BRIEF DESCRIPTION OF THE DRAWINGS

FIG. 2 is a fragmentary front elevational view of the viewing screen and lifting apparatus therefor which are contained in this housing;

FIG. 3 is a side view of the viewing screen and lifting apparatus of FIG. 2;

FIGS. 4 and 5 are fragmentary side views of the housing with its doors removed, and showing the retracted and raised positions, respectively, of the screen in relation to the housing;

DETAILED DESCRIPTION OF THE INVENTION

Figure 1:
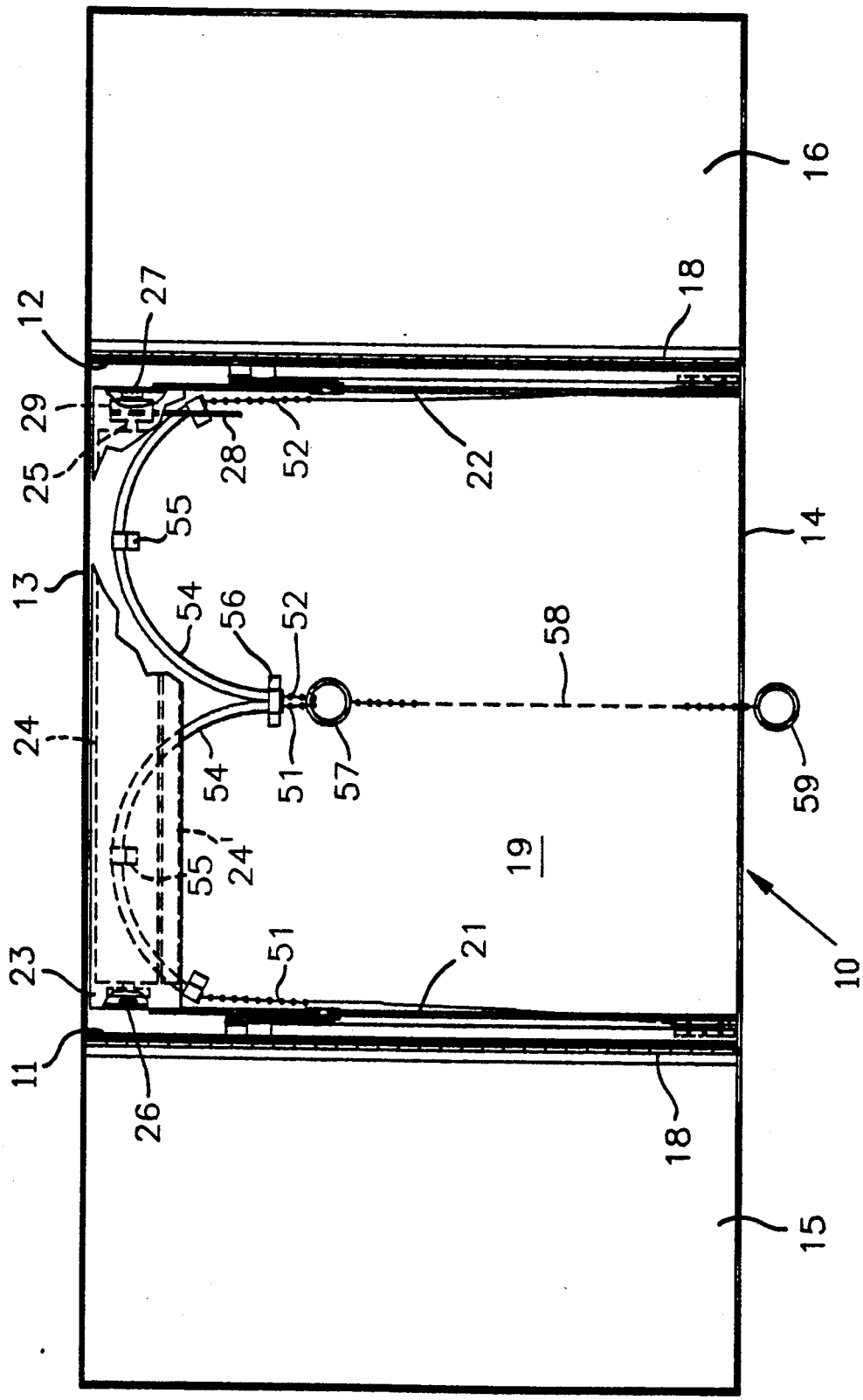
FIG. 1 is a fragmentary front elevational view of a viewing screen housing and display device made according to one embodiment of this invention, the two doors of the housing being shown in their open position.

Referring now to the drawings by numerals of reference, 10 denotes generally a rectangularly shaped housing having a pair of spaced, parallel end walls 11 and 12, parallel top and bottom walls 13 and 14, respectively, which extend at right angles to the end walls 11 and 12, and a pair of doors 15 and 16, which are connected by conventional hinges 18 to the forward edges of walls 11 and 12, respectively. Mounted in housing 10 on the upper ends of a pair of spaced lifting arms 21 and 22 is an elongate screen casing 23, which contains a conventional viewing screen 24. Screen 24 is wound on a shaft 25 which is rotatably supported at opposite ends thereof in a conventional manner in roll holders 26 and 27 that are mounted in opposite ends of the screen casing 23. The screen 24 can be rolled up and unrolled by pulling a drawstring 28 which engages the circumference of a drive roll 29 that is secured to one end of shaft 25.

Attached to the outside surface of each lifting arm 21 and 22 adjacent the lower end thereof is a rectangularly shaped bearing plate 30. Each plate 30 supports thereon a pair of spaced rollers 32 and 34, which are mounted to rotate freely on a pair of parallel pins 36 that project from one side of each plate 30. Each plate 30 is fastened to its associated lifting arm 21 or 22 by a pair of screws 38 (FIG. 3), or alternatively by welding, and extends rearwardly from its associated arm 21 or 22. Also, the rollers 32 and 34 of each plate are vertically and horizontally spaced in a diagonal relationship.

Casing 23 is joined at opposite ends thereof to the tops of arms 21 and 22 by a suitable fastening means, such as by screws 39 (FIG. 3), and extends forwardly therefrom so that the drawstring 28 extends downwardly in front of arms 21 and 22. Initially the viewing screen lifting assembly, as shown for example in FIG. 3 by the screen casing 23 and its lifting arms 21, 22, rests interiorly of the housing 10.

At such time the two guide rolls 32 and 34 on each plate 30 have rolling engagement with opposite sides of one of a pair of registering, rigid ribs or guide tracks 41 adjacent the lower end thereof. Tracks 41 project from the inside faces of a pair of elongate straps or plates 42, which are secured to the inside surfaces of the housing walls 11 and 12, respectively, so that their ribs or tracks 41 are inclined to the vertical, leaning away from the rear wall 19 of housing 10 as they extend upwardly from the housing bottom wall 14.

A pair of guide arms 44 are connected to arms 21 and 22 for slidable engagement therewith. Each guide arms 44 is pivotally connected by a pin 45 to a bracket 46 which is secured to and projects from the inside surface of housing back wall 19. The other end of each arm 44 is pivotably connected by a pin 48 to one of two sleeves 49 which are mounted for sliding movement on arms 21 and 22, respectively. Sliding sleeves 49 and arms 44 prevent their respective lifting arms 21 and 22 and attached casing 23 from moving from side to side, and also help to prevent jamming of the rollers 32 and 34 on tracks 41.

When preparing the viewing screen 24 for operation, the initial step is to move the viewing screen container 23 and its lifting arms 21 and 22 from their inwardly tilted or retracted positions as shown in FIG. 4, to their outwardly tilted positions as shown in FIG. 5. As seen in FIG. 5, the roller 32 and 34 control the amount of tilt of arms 21 and 22, and prevent them from tilting too far away from housing 10. This outwardly tilted position of the lifting apparatus allows the viewing screen casing 23 to be erected without interference from the housing top wall 13. Plates 30 retain the rollers 32 and 34 in their proper rolling positions to prevent binding on tracks 41 when the lifting arms 21 and 22 and viewing screen casing 23 are lifted or elevated, as noted hereinafter.

The erected viewing screen casing 23 is shown in FIG. 5. Casing 23 can be raised by a first pair of chains 51 and 52, which are attached each at one end as at 53 (FIG. 5) to a respective bearing plates 30. At their opposite ends chains 51 and 52 extend vertically into and through a pair of curved tubes 54 (FIG. 1). Tubes 54 act in the same manner as pulleys to reverse the direction of force, but also provide the added function of preventing interference of these chains with the viewing screen 24 or its elongate casing 23. Each tube 54 is supported by brackets 55 on the backwall 19 of housing 10. Chains 51 and 52 exit tubes 54 adjacent a central bracket 56, and at that point are fastened to a ring 57. Ring 57 is in turn attached to a pull chain 58 which extends vertically downwardly therefrom through a keyhole slot 60 in the housing bottom wall 14 and ends in a large pull ring 59.

Figure 6:
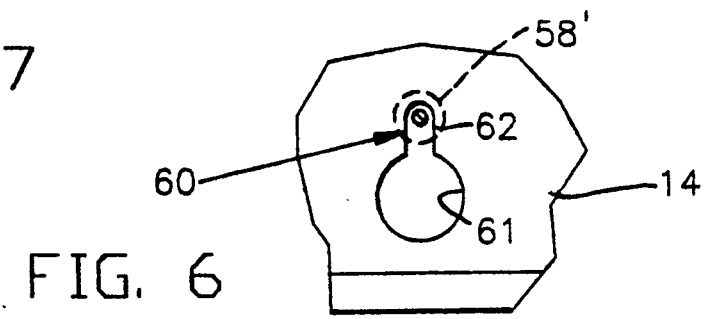
FIG. 6 is an enlarged fragmentary plan view of the keyhole lock mechanism broken away from the base of the housing; and, FIG. 7 is a front elevational view similar to FIG. 1 but showing a writing surface mounted inside the housing.

As shown more clearly in FIG. 6, keyhole slot 60, which is formed in bottom wall 14 of housing 10, includes a large circular portion 61 through which the beads 58' of chain 58 may freely pass as casing 23 is raised and lowered, and a small, radial slot portion 62 in which the connection between any pair of adjacent beads 58' may be latched to hold casing 23 in a selected elevated position.

OPERATION

The viewing screen 24 is placed in operation by opening the hinged doors 15 and 16, and then tilting the viewing screen lifting assembly outwardly as shown in FIG. 5. The next step is to raise the lifting assembly by grasping ring 59 and pulling it downwardly until the viewing screen casing 23 is elevated to a desired height as shown in FIG. 5. The assembly can be locked in the desired elevated height by moving adjacent beads 58' of the chain 58 from the larger opening 61 of keyhole slot 60 into the locking opening 62, whereby the screen casing 23 will remain in its elevated position.

The viewing screen 24 includes a magnetic strip 24' at the lower end thereof as shown in FIGS. 1, 4 and 5. The strip 24' allows the screen 24 to be extended and locked in the extended position by engaging a metal surface. The magnetic strip is lowered by pulling drawstring 28 to turn the enlarged roller 29 and cause the screen 24 to unroll. When the screen is at its desired length, magnetic strip 24 is attached to a suitable ferric metallic surface and the screen will stay in the extended position. Alternatively, screen 24 may be of the type which is not spring-loaded, but instead is raised and lowered by pulling cord 28 in one direction to the other.

To put the screen and lifting assembly away, one merely unhooks the ball 58' from the slot 62 and allows the lifting assembly to slowly roll down tracks 41 until the bottom wall 14 of the housing 10 is reached. Then the lifting assembly is tilted back to lean against rear wall 19. Doors 15 and 16 can then be closed to conceal the viewing screen assembly. Preferably, the screen 24 is rerolled, but it is not absolutely necessary.

It should be noted that doors 15 and 16 may include writing surfaces on their interior and/or exterior surfaces, or may include a decorative covering on the exterior surfaces to provide a complimentary appearance to the room decor.

Figure 7:
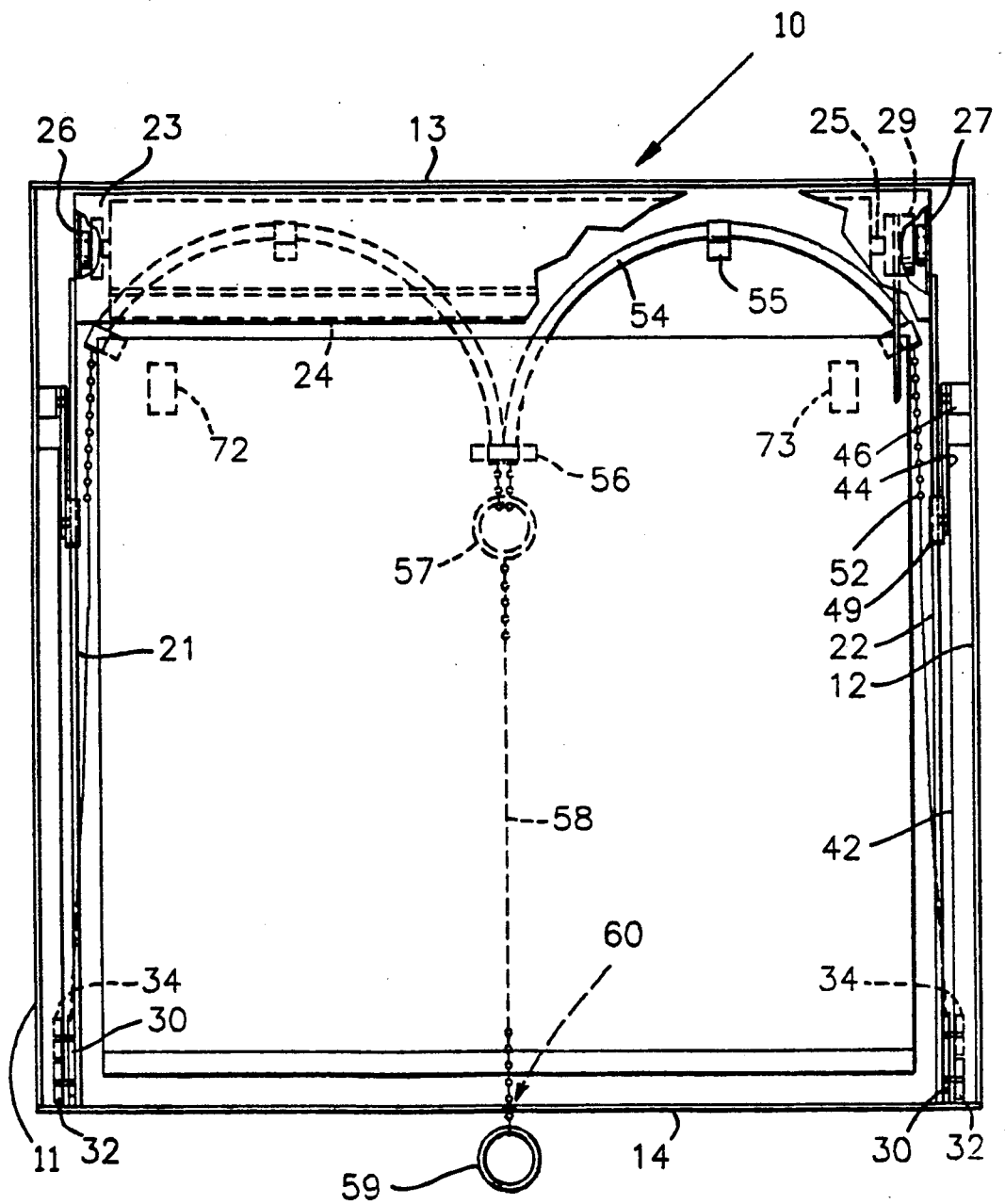

Furthermore, as shown in FIG. 7, a magnetic display or write-on-wipe off board 71 having a writing surface thereon is preferably hingedly mounted by a pair of brackets 72 and 73 to the back wall 19 below roller casing 23 and between tracks 41.

While this invention has been illustrated and described in connection with certain embodiments thereof, it is understood that it is capable of further modifications, uses and/or adaptations of the invention following in general the principle of the invention and including such departures from the present disclosure as come with known or customary practice in the art to which the invention pertains, and as may be applied to the central features hereinafter set forth, and fall within the scope of the invention and the limits of the appended claims.

We claim:

1. Viewing screen and display apparatus, comprising
a housing for concealing a viewing screen when not in use,
a viewing screen casing mounted in said housing adjacent the upper end thereof, and containing a viewing screen which at rest is rolled up inside said casing,
said housing having a pair of spaced-apart substantially vertically extending side walls,
a display board mounted in said housing between said side walls thereof and beneath said casing, and having thereon a writing surface disposed selectively to be covered by said screen,
vertical lifting means interposed between said walls and said viewing screen casing, and
said lifting means being operable selectively to elevate said viewing screen casing from a retracted position in said housing to an elevated position above said housing.

2. Viewing screen and display apparatus as set forth in claim 1, wherein
said vertical lifting means includes cable means and lifting arm means;

said cable means is connected to said lifting arm means; and, said lifting arm means is operable to elevate said viewing screen casing when a pulling force is applied to said cable means.

3. Viewing screen and display apparatus, comprising a housing for concealing a viewing screen when not in use, a viewing screen casing mounted in said housing, said housing having a pair of spaced-apart substantially vertically extending side walls, and vertical lifting means interposed between said walls and said viewing screen casing, said lifting means being operable selectively to elevate said viewing screen casing from a retracted position in said housing to an elevated position above said housing, said vertical lifting means including cable means and lifting arm means;

said cable means being connected to said lifting arm means;

said lifting arm means being operable to elevate said viewing screen casing when a pulling force is applied to said cable means, said cable means extending through a pair of channel means for reversing the direction of force applied to said cable means;

said cable means including a gripping portion and a lifting portion; and said gripping portion of said cable means being disposed to be grasped manually and pulled downwardly, said lifting portion in turn being operative to apply a lifting force to said lifting arm means to elevate said viewing screen casing for use.

4. Viewing screen and display apparatus as set forth in claim 3, wherein said viewing screen casing extends substantially horizontally between said housing side walls, and opposite ends of said casing are connected to said lifting arm means to be supported thereby for vertical movement relative to said housing.

5. Combined viewing screen and display apparatus, comprising a housing having a pair of spaced, generally vertically disposed side walls, and a rear wall extending between said side walls, a viewing screen casing mounted on said housing for movement between a retracted position within said housing, and an elevated position above said housing, a pair of spaced, generally vertically disposed support arms mounted in said housing adjacent said side walls, and operatively connected adjacent their upper ends to opposite ends of said screen casing, and means mounting said arms in said housing for limited tilting movement in unison toward and away from said rear wall of said housing, and for translational vertical movement relative to said housing, said mounting means including means operable selectively to raise and lower said arms relative to said housing, when said arms have been tilted away from said rear wall, thereby to move said casing into and out of said elevated position.

6. Combined viewing screen and display apparatus as defined in claim 5, wherein said mounting means further includes stationary guide means mounted on said side walls and operatively connected to said support arms to guide said support arms for vertical movement along paths inclined to said rear wall of said housing, when said arms are caused to move vertically relative to said housing.

7. Combined viewing screen and display apparatus as defined in claim 6, wherein said stationary guide means comprises a pair of tracks secured to and projecting from the inside surface of each of said side walls of said housing, and a pair of spaced rollers is mounted on each of said arms adjacent the lower end thereof for rotation about spaced, parallel axes, and to have rolling engagement with opposite sides of one of said tracks thereby to guide said arms for tilting and translational movement relative to said housing.

8. Combined viewing screen and display apparatus as defined in claim 5, including a pair of doors hingedly connected to the outer edges of said side walls of said housing remote from said rear wall thereof, and movable about spaced, parallel hinge axes between open positions in which they extend in planes generally parallel to said rear wall of said housing, and closed positions in which they cover said viewing screen casing and said support arms, when said casing is positioned in said retracted position.

* * * * *